(12) United States Patent
Lee et al.

(10) Patent No.: US 7,422,346 B2
(45) Date of Patent: Sep. 9, 2008

(54) METHOD OF FORMING A LAMP ASSEMBLY

(76) Inventors: John W. Lee, 1000 NE. Circle Blvd., Corvallis, OR (US) 97330-4239; Jimmy Perez, 1000 NE. Circle Blvd., Corvallis, OR (US) 97330-4239

(*) Notice: Subject to any disclaimer, the term of this patent is extended or adjusted under 35 U.S.C. 154(b) by 205 days.

(21) Appl. No.: 11/192,762

(22) Filed: Jul. 29, 2005

(65) Prior Publication Data

US 2007/0081343 A1    Apr. 12, 2007

(51) Int. Cl.
*F21V 7/00*     (2006.01)
*F21V 19/02*    (2006.01)
*G03B 21/28*    (2006.01)

(52) U.S. Cl. .................. 362/296; 362/285; 362/341; 353/98

(58) Field of Classification Search .............. 362/296, 362/263, 285, 341, 347, 350, 418; 353/98, 353/99
See application file for complete search history.

(56) References Cited

U.S. PATENT DOCUMENTS

| | | | |
|---|---|---|---|
| 4,608,624 A | 8/1986 | Blaisdell et al. | |
| 4,785,383 A | 11/1988 | Tarnay | |
| 5,839,818 A * | 11/1998 | Janson et al. | 362/645 |
| 6,179,456 B1 | 1/2001 | Nakamura et al. | |
| 6,657,369 B1 * | 12/2003 | Tamaru et al. | 313/318.11 |
| 6,863,418 B2 | 3/2005 | Masuoka et al. | |
| 7,011,433 B2 * | 3/2006 | Koegler et al. | 362/296 |
| 2002/0024811 A1 | 2/2002 | Horikawa | |
| 2004/0240216 A1 | 12/2004 | Basey | |
| 2004/0264200 A1 | 12/2004 | Hirano et al. | |
| 2005/0047146 A1 | 3/2005 | Miyata et al. | |
| 2005/0099813 A1 * | 5/2005 | Hashizume | 362/261 |

\* cited by examiner

*Primary Examiner*—Sharon Payne
*Assistant Examiner*—Sean P Gramling

(57) ABSTRACT

A method of forming a lamp assembly includes removably coupling a burner assembly to a datum structure, the burner assembly including a fireball, moving the datum structure and the burner assembly to an aligned position relative to a reflector such that the fireball is at a focal point of the reflector, and securing the datum structure and the reflector in the aligned position.

13 Claims, 4 Drawing Sheets

METHOD OF FORMING A LAMP ASSEMBLY

BACKGROUND

Digital projectors, such as digital micro-mirror devices (DMD) and liquid crystal devices (LCD) projectors, project high quality images onto a viewing surface. Both DMD and LCD projectors utilize high intensity lamps and reflectors to generate the light needed for projection. Light generated by the lamp is concentrated as a "fireball" that is located at a focal point of a reflector. Light produced by the fireball is directed into a projection assembly that produces images and utilizes the generated light to illuminate the image. The image is then projected onto a viewing surface. Misalignment of the focal point causes degradation of the image since less light is captured and creates "hot spots" on the screen instead of a uniform brightness.

Efforts have been directed at making projectors more compact while making the image of higher and better quality. As a result, the lamps utilized have become more compact and of higher intensity. Higher intensity lamps produce high, even extreme heat. The outer surface of the lamps can approach temperatures of 900 degrees C. As a result, projector designs must account for the intense heat. In addition, losses due to misalignment of the fireball with respect to the reflector are amplified in systems utilizing high intensity lamps.

Some designs attempt to account for the heat by permanently placing the lamp within the reflector. The use of a high temperature "epoxy" holds the lamp relative to the reflector. Flexible electrodes from the lamp are then placed through two holes in the reflector and are soldered to a metal connection. This connection is made manually, thereby adding expense to the fabrication of the unit. Further, the two holes in the reflector allow light to escape, thereby degrading the image produced. The other end of the metal connection allows wires to be attached from the electrical connector. When the lamp has surpassed its useful life, the costly reflector and lamp assembly, which can be considered as the light generation assembly, is replaced. When the assembly is replaced, the old assembly is discarded.

SUMMARY

A method of forming a lamp assembly includes removably coupling a burner assembly to a datum structure, the burner assembly including a fireball, moving the datum structure and the burner assembly to an aligned position relative to a reflector such that the fireball is at a focal point of the reflector, and securing the datum structure and the reflector in the aligned position.

BRIEF DESCRIPTION OF THE DRAWINGS

The accompanying drawings illustrate various embodiments of the present apparatus and method and are a part of the specification. The illustrated embodiments are merely examples of the present apparatus and method and do not limit the scope of the disclosure.

Throughout the drawings, identical reference numbers designate similar, but not necessarily identical, elements.

DETAILED DESCRIPTION

A lamp assembly and method for forming such a lamp assembly are provided herein. The lamp assembly is suitable for use in a display system. The lamp assembly makes use of a non-metallic reflector with a datum structure secured thereto. The datum structure allows a burner assembly to be removably coupled to the non-metallic reflector. By removably coupling the burner assembly to the reflector, the burner assembly alone may be replaced when the burner has surpassed its useful life.

In the following description, for purposes of explanation, numerous specific details are set forth in order to provide a thorough understanding of the present method and apparatus. It will be apparent, however, to one skilled in the art that the present method and apparatus may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Display System

Figure 1:
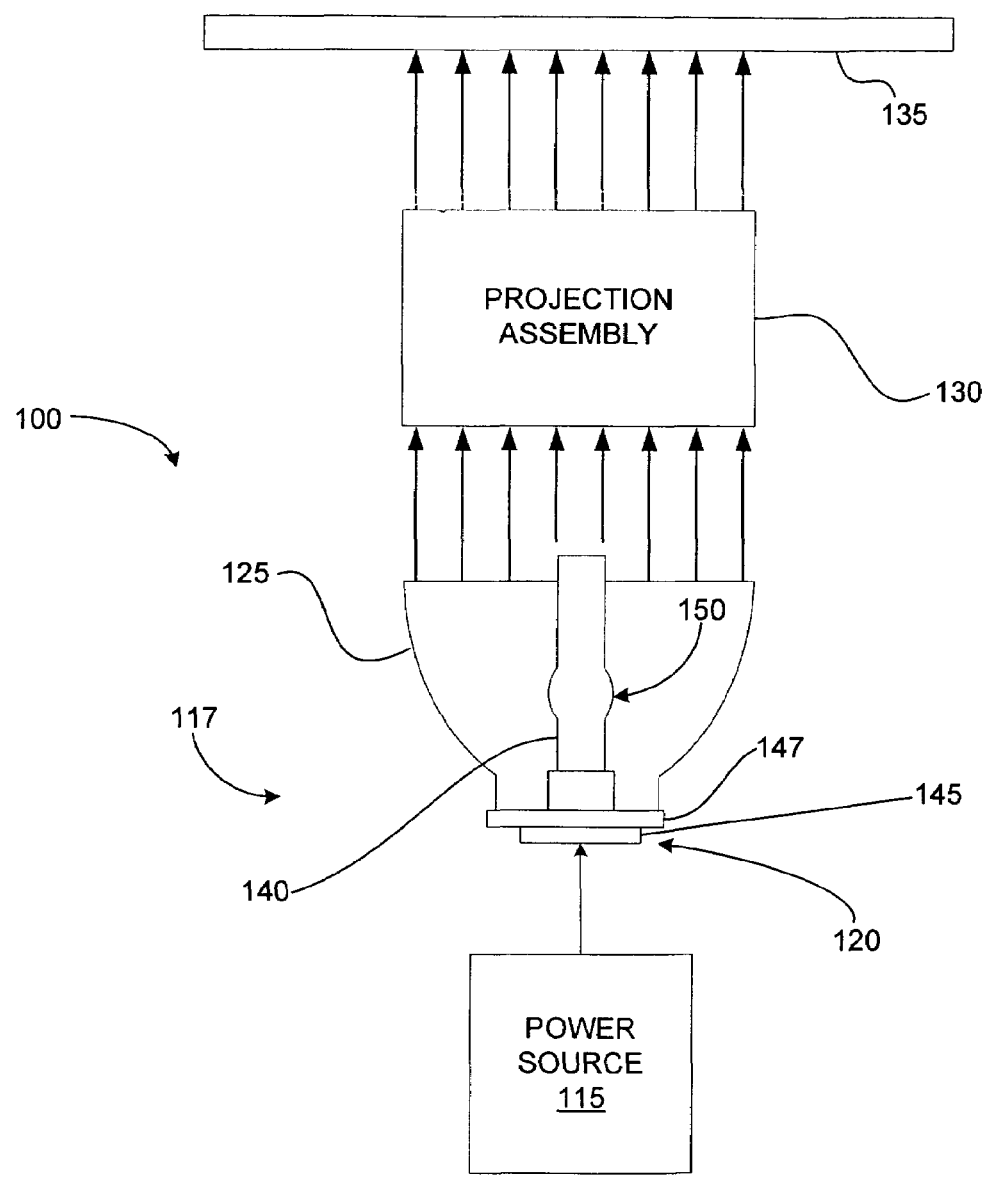
FIG. 1 is a schematic view of a display system according to one exemplary embodiment.

FIG. 1 is a schematic view of a display system (100). The display system (100) generally includes a power source (115), a lamp assembly (117) including a burner assembly (120) and a reflector (125), a light modulator assembly (130), and a viewing surface (135). According to the present exemplary embodiment, the reflector (125) may be a standard reflector, such as a glass, ceramic, or other type of non-metallic reflector. The burner assembly (120) is oriented relative to the reflector (125) and is removably coupled thereto. The power source (115) is also coupled to the burner assembly (120)

In particular, the burner assembly (120) includes a burner (140) coupled to a header (145). The header (145) provides support and alignment for the burner (140) relative to the reflector (125). According to the present exemplary embodiment, the header (145) also allows the burner assembly (120) to be removably coupled to the reflector (125). As a result, when the burner (140) has surpassed its useful life, the burner assembly (120) may be replaced without replacing the entire lamp assembly (117).

The burner (140) may be precisely aligned relative to the header (145) using a visual alignment process while the burner (140) is cold. As a result, the center of the burner (140) may be precisely aligned relative to the header (145). The reflector (125) is configured to receive the burner assembly (120). In addition, the reflector is configured to have the header (145) placed into aligned contact therewith. In particular, according to one exemplary embodiment the reflector (125) has a datum structure (147) secured thereto. The header (145) may then be placed in contact with the datum structure (147).

The alignment of the burner (140) relative to the header (145) and the alignment of the header (145) relative to the datum structure (147) and thus the reflector (125) provides for alignment of the burner (140) relative to the reflector (125). More specifically, according to one exemplary embodiment, the burner (140) generates concentrated light, referred to as a fireball, in a central portion (150) thereof. By aligning the fireball with the focal point of the reflector (125), the amount of light generated by the lamp assembly (117) may be optimized. An exemplary burner assembly, including features used by an exemplary system and method of aligning a burner relative to the header will now be discussed in more detail.

Method of Forming Lamp Assembly

Figure 2:
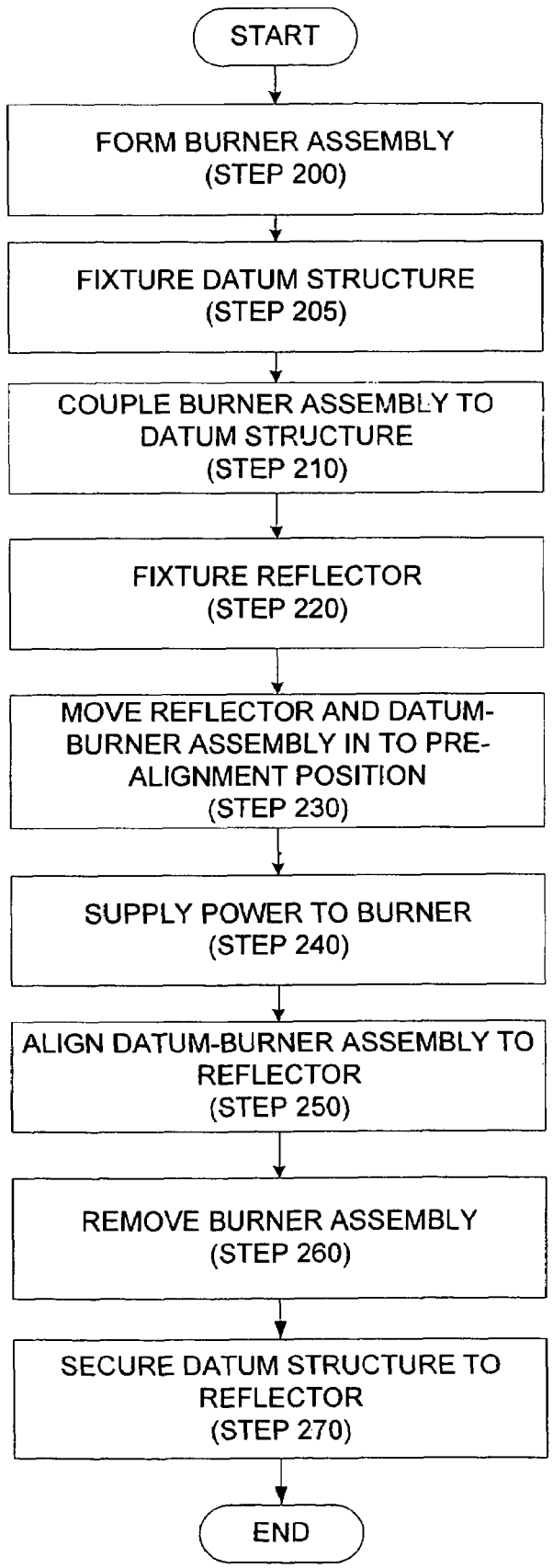
FIG. 2 is a flowchart illustrating a method of forming a lamp assembly according to one exemplary embodiment.

FIG. 2 illustrates an exemplary method of forming a lamp assembly. The method begins by forming a burner assembly (step 200). According to one exemplary embodiment, the burner assembly includes a burner and a header. The header includes at least one reference surface. As will be discussed in more detail below, this reference surface may be placed into contact with a corresponding datum surface. If the position of the datum surface relative to a reflector is known, and the position of the header relative to the datum is known, the position of the header relative to the reflector may also be known. According to the present exemplary embodiment, formation of the burner assembly includes alignment of the burner relative to the header. By aligning the burner relative to the header, the location of a central portion of the burner may thus be fixed relative to a reference surface on the header. Thus, the position of a central portion of the burner may be aligned relative to a reflector by placing a reference surface of the header in contact with the datum surface, which is in turn coupled to the reflector.

A datum structure is then placed in a fixture (step 205). The datum structure includes at least one datum surface referenced above. Further, the datum structure may be separately formed with the datum surfaces. One such exemplary datum structure will be discussed in more detail below.

The burner assembly is then coupled to the datum structure (step 210). According to one exemplary method, coupling the burner assembly to the datum structure includes placing the reference surface on the header in contact with the datum surface on the datum structure. The resulting assembly may be referred to as a datum-burner assembly. As previously introduced, the datum structure may be secured in a fixture. With the burner assembly coupled to the datum structure, the location and orientation of the datum-burner assembly is controlled by the fixture.

A non-metallic reflector is then placed in another fixture (step 220). Such a fixture may either be a mobile fixture or a static fixture. For ease of reference, a static fixture will be described herein, such that after the reflector is placed in the fixture, the fixture does not move.

With the reflector located in the fixture, the datum-burner assembly is then moved into a pre-alignment position relative to the reflector (step 230). According to one exemplary method, placing the datum-burner assembly in a pre-alignment position includes moving the datum-burner assembly into proximity with the reflector. At such a position, at least a portion of the burner is placed into the reflector. For example, the reflector may include an opening and a cavity. According to such an embodiment, one tip of the burner may be passed through the opening reflector and into the cavity as the datum-burner assembly is moved into the pre-alignment position.

Power is then supplied to the burner (step 240). The power causes the burner to fire, or generate light. For ease of reference, an ultra-high pressure mercury-type burner will be described in the illustrated implementation. The application of power to the burner creates a fireball in the presence of mercury vapor or other such vapor that results in the generation of a plasma caused by an arc across first and second electrodes. The fireball may be generated near a central portion of the burner.

The reflector and burner-datum assembly are then aligned (step 250). For example, according to one exemplary method, the burner-datum assembly is moved relative to the reflector until the light that is generated by the burner and directed out of the reflector is at a maximum. In particular, according to one exemplary method, this occurs when the fireball is located at or near the focal point of the reflector. Thus, according to one exemplary method, aligning the reflector and burner-datum includes moving the fireball near the focal point of the reflector. In order to determine whether the light output is at a maximum value, the light from the reflector may be directed to a power meter or integrating sphere or may be determined using any measurement techniques known to those in the art.

At this point, the components of the lamp assembly, including the burner-datum assembly and the reflector are properly aligned. In particular, the fireball of the burner is located at or near the focal point of the reflector. The aligned position of the burner relative to reference surfaces on the header were already known. The reference surfaces are in contact with at least one datum surface, thereby constraining the aligned location and orientation of the burner assembly relative to the datum structure. The location and orientation of the datum structure is also preliminarily constrained relative to the reflector, due to the placement of the datum structure and the reflector in fixtures. This preliminary alignment is then secured, such that the location and orientation of the datum structure relative to the reflector is also secured.

For example, according to one exemplary method, once the burner-datum assembly is aligned relative to the reflector (step 250), the burner assembly is removed from the datum-burner assembly while retaining the datum structure in its aligned position relative to the reflector (step 260). In particular, the burner may be withdrawn through the reflector opening by moving the burner assembly away from the datum structure and reflector. As a result, the datum structure remains in an aligned position relative to the reflector.

With the datum structure in this aligned position, the datum structure may then be secured to the reflector (step 270). According to one exemplary method, securing the datum structure to the reflector may include tacking the datum structure to the reflector to initially maintain the alignment between the datum structure and the reflector. Thereafter, ceramic cement may then be applied to permanently secure the datum structure to the reflector.

By securing the datum structure to the reflector, the relative position of the datum surfaces on the datum structures relative to the focal point of the reflector may thus be secured. As previously introduced, the relationship between reference surfaces and the fireball are known, as well as the alignment between the reference surfaces and the datum structure. Thus, with the datum structure secured in an aligned position relative to the reflector, the burner assembly may thus be removably coupled to the datum structure by placing the reference surfaces on the header into contact with the datum surfaces on the datum structure such that the fireball will be at or near the focal point of the reflector when the lamp assembly is at its operating temperature. Such a configuration may allow the replacement of the burner assembly alone when the burner has surpassed its useful life. An exemplary lamp assembly will now be discussed in more detail.

Lamp Assembly

Figure 3:
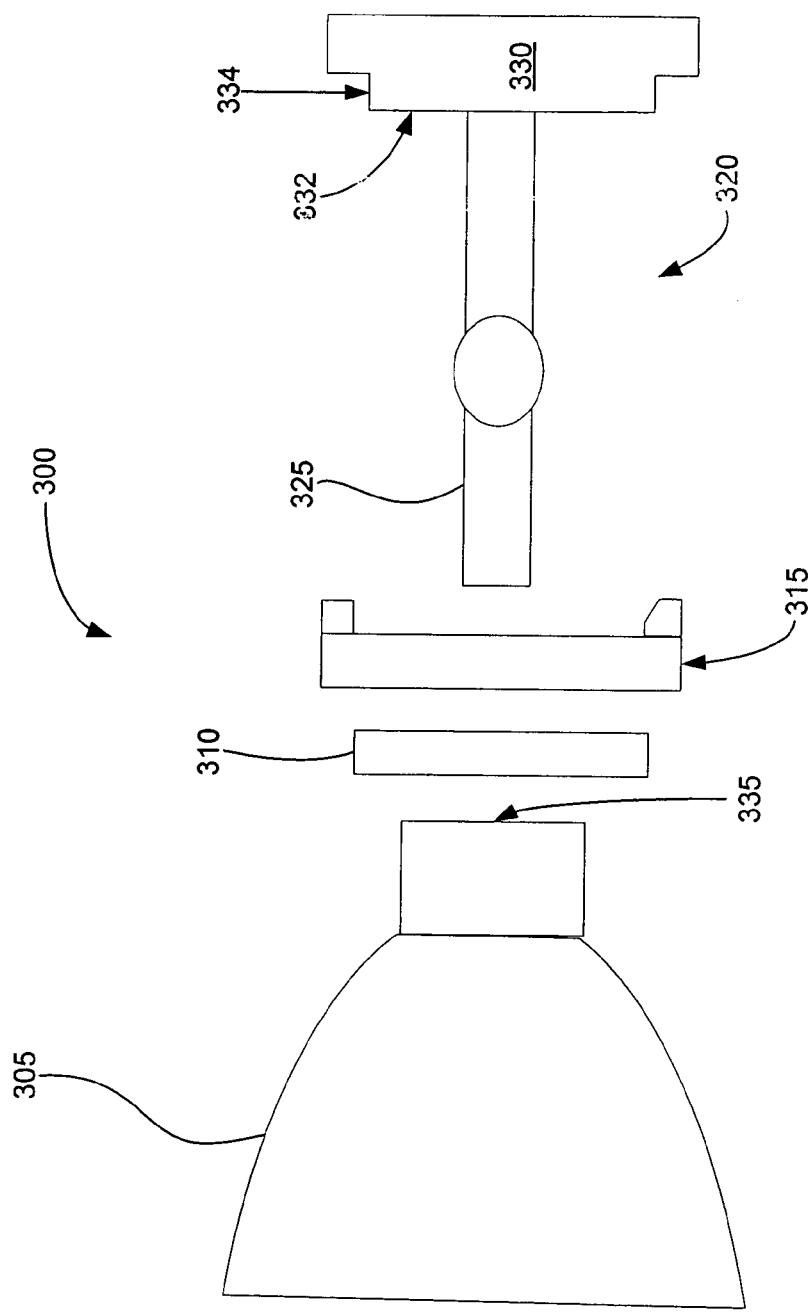
FIG. 3 illustrates an exploded view of a lamp assembly according to one exemplary embodiment.

FIG. 3 illustrates an exploded view of an exemplary lamp assembly (300). The lamp assembly (300) generally includes a reflector (305), an adhesive (310), a datum structure (315), and a burner assembly (320) having a burner (325) coupled to a header (330). As will be discussed in more detail below, the lamp assembly may allow a burner assembly to be removably coupled to a non-metallic reflector.

The datum structure is at a known location and orientation relative to the reflector. When the lamp assembly (300) is assembled, the datum structure (315) is secured to the reflector (305) and the header (330) is in contact with the datum structure (315). In particular, the header (330) according to one exemplary embodiment includes a front reference surface (332) and side reference surfaces (334). The location and orientation of the fireball of the burner (325) relative to these surfaces (332, 334) is known, as discussed above. When these surfaces are in contact with the datum structure (315), the fireball is thus located at or near the focal point of the reflector (305) when the lamp assembly (300) is at its operating temperature.

The datum structure (315) may be a component separate from the reflector. For example, the datum structure (315) may be separately formed and then coupled to the reflector (305) with the adhesive (310). According to one exemplary embodiment, the adhesive (310) used to secure the datum structure (315) to the reflector (305) is high temperature ceramic cement.

The reflector (305) according to one exemplary embodiment is a non-metallic reflector. Non-metallic reflectors include, without limitation, glass and/or ceramic reflectors. Such reflectors include a non-metallic body with a cavity defined therein. The inner portion of the reflector has a reflective surface formed thereon. The reflective surface may have a generally parabolic or elliptical shape. Further, the reflector (305) may be configured to be utilized in a number of systems, including projection or television applications. The reflector (305) also includes an opening (335) defined therein. The reflector opening (335) is of sufficient size to allow at least part of the burner (325) to be passed through.

For ease of reference, the following description is described with reference to an X, Y, and Z coordinate system. This system is described with reference to the origin being at the center of the datum structure (315) in which Z-axis represents the direction of insertion. Although, the X, Y, and Z-axis are described herein as orthogonal (such as in rectangular coordinates), other axes could be used that are non-orthogonal such as with a cylindrical or polar coordinate system. Further, while one exemplary datum structure is shown, any datum structure may be utilized.

Figure 4:
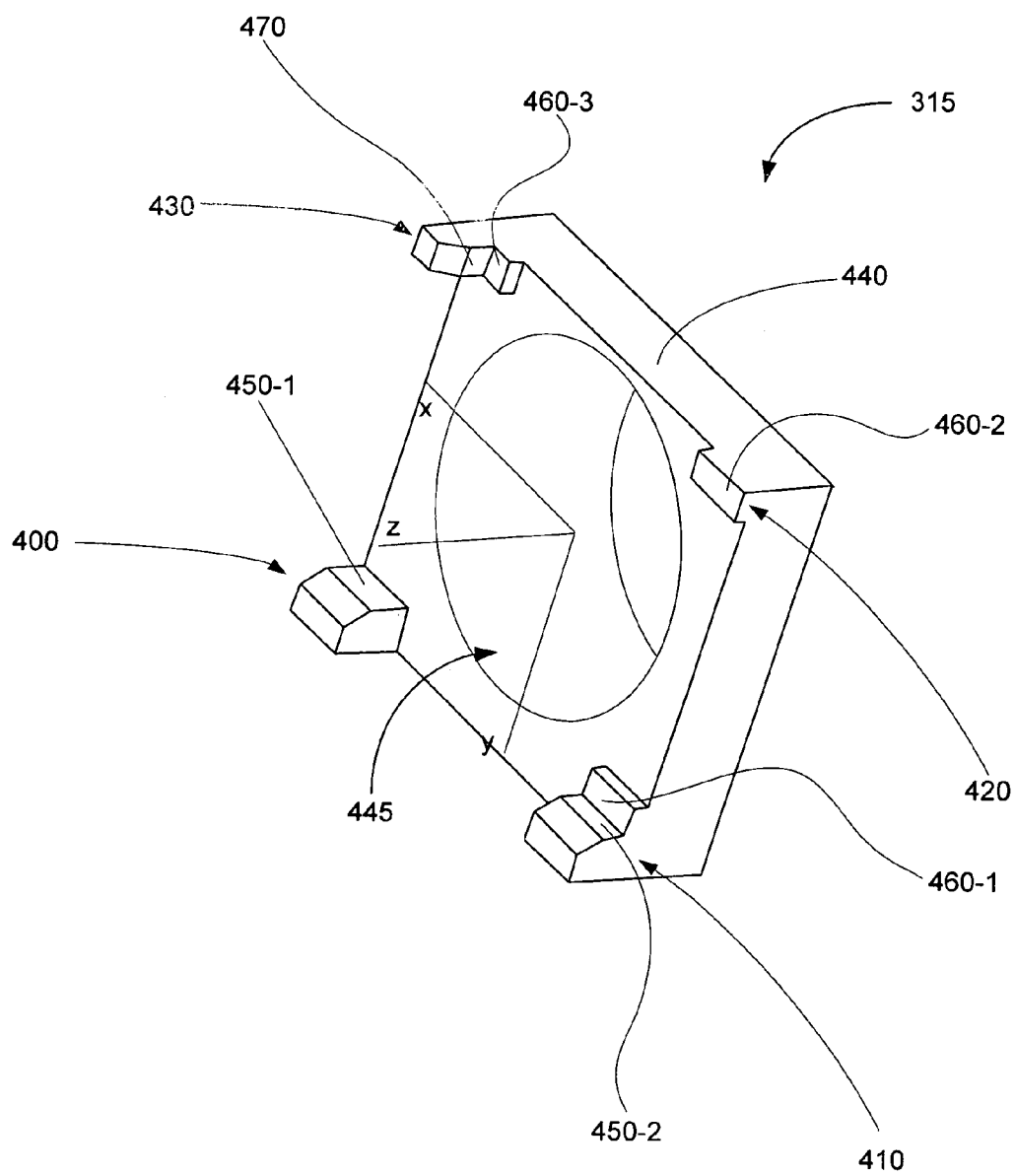
FIG. 4 illustrates a perspective view of a datum structure according to one exemplary embodiment.

FIG. 4 illustrates one exemplary datum structure (315) in more detail. In particular, FIG. 4 illustrates a perspective view of the datum structure according to one exemplary embodiment. The datum structure (315) according to the present exemplary embodiment includes first, second, third, and fourth protrusions (400, 410, 420, and 430 respectively) that are formed on a base member (440). The base member (440) has a datum opening (445) defined therein. The datum opening (445) is sized to allow at least a portion of the burner (325; FIG. 3) to be passed therethrough. The protrusions according to the present exemplary embodiment are located around a perimeter of the base member (440).

Each of the protrusions includes at least one datum alignment surface. The first protrusion (400) includes a Y-axis alignment surface (450-1). The Y-axis alignment surface (450-1) is an alignment datum surface for aligning a lamp assembly in the X-Z plane. Accordingly, the Y-axis alignment surface (450-1) is substantially parallel to the X-Z plane. This alignment is accomplished by placing a corresponding surface of the lamp assembly in contact with the Y-axis alignment surface (450-1).

The second protrusion (410) includes a Y-axis alignment surface (450-2) and a Z-axis alignment surface (460-1). Accordingly, the second protrusion contains two datum surfaces, one each for alignment of a lamp assembly with respect to the X-Y plane and for alignment with respect to the X-Z plane. As a result, the Z-axis alignment surface (460-1) is substantially parallel to the x-y plane. Similarly, the Y-axis alignment surface (450-2) is parallel to x-z plane. The Y-axis alignment surface (450-2) on the second protrusion (410) is coplanar to the Y-axis alignment surface (450-1) on the first protrusion (400). As will be discussed in more detail below, placing two corresponding surfaces in contact with the Y-axis alignment surfaces (450-1, 450-2) fully constrains the motion of those corresponding surfaces with respect to the Y-axis.

The third protrusion (420) has a Z-axis alignment surface (460-2). The Z-axis alignment surface (460-2) is a single datum surface for aligning a part with respect to the X-Y plane. The Z-axis alignment surface (460-2) is coplanar with the Z-axis alignment surface (460-1) of the second protrusion (410).

The fourth protrusion (430) includes an X-axis alignment surface (470) and a Z-axis alignment surface (460-3). The X-axis alignment surface (470) is parallel to the Y-Z plane. Accordingly, the Z-axis alignment surface (460-3) is substantially parallel to the X-Y plane. The Z-axis alignment surface (460-3) on the fourth protrusion (420) is substantially coplanar with both of the other Z-axis alignment surfaces (460-1, 460-2) on the second and third protrusions (410, 420) respectively.

The first, second, and third protrusions (400, 410, 420) each include beveled surfaces (480-1, 480-2, 480-3). The beveled surfaces (480-1, 480-2, 480-3) allow easier orientation of a corresponding component by guiding surfaces of the component into contact with the datum structure (315).

The configuration of the datum structure (315) ensures that placement of corresponding surfaces of a component in contact with the surfaces of the datum structure will constrain the movement of the component in the X, Y, and Z directions. This is true of components that are substantially rigid or that can be modeled as such.

For example, the Y-axis alignment surfaces (450-1, 450-2) are substantially coplanar. In other words, a single plane passes through the Y-alignment surfaces (450-1, 450-2). This single plane is substantially parallel to the X-Z plane. As previously discussed, coplanar surfaces placed in contact with the Y-axis alignment surfaces (450-1, 450-2) are constrained in the Y-direction. As a result, placing coplanar surfaces of a component to be aligned in contact with the Y-axis alignment surfaces constrains the alignment of the component in the Y-direction. A component under these conditions alone, while aligned with respect to the Y-axis, may be misaligned in the X and/or Z directions in the X-Z plane.

Placement of corresponding surfaces on the header (330; FIG. 3) against the three Z-axis alignment surfaces (460-1, 460-2, and 460-3) fully constrains the orientation of the header (330; FIG. 3) with respect to the Z-axis. An arbitrary orientation would be defined with three points regardless of the location of the three points, since any three points define a plane. In this case, all three surfaces on the datum structure are substantially coplanar. As a result, the three coplanar surfaces define an alignment plane. This alignment plane is parallel to the X-Y plane.

The corresponding surface of the header (330; FIG. 3) according to one exemplary embodiment is substantially flat. As a result, if the header (330; FIG. 3) is placed in contact with these three alignment surfaces (460-1, 460-2, 460-3) the orientation of the component in the Z-axis will be fully constrained in the alignment plane. As discussed, the Y-axis alignment surfaces (450-1, 450-2) limit misalignment of the component with respect to the Y-axis in the X-Z plane. The Z-axis alignment surfaces limit misalignment in the Z-direction. If the component is also placed in contact with the Z-axis alignment surfaces (460-1, 460-2, 460-3), misalignment in the X-direction in the X-Z plane remains as the only source of misalignment.

This source of misalignment may be minimized or eliminated by placing the component in contact with at least one X-alignment datum surface. In the illustrated implementation, a single X-axis alignment surface (470) constrains alignment in the X-direction. As a result, when one of the perimeter surfaces of the header is placed into contact with the rest of the alignment surfaces, the X-axis alignment surface is able to fully constrain the third dimensional orientation of a component. Thus, by placing the header (330; FIG. 3) into contact with the datum structure (315; FIG. 3), the fireball of the burner (325; FIG. 3) may be placed at or near the focal point of the reflector (305; FIG. 3) while allowing the burner assembly (320; FIG. 3) alone to be replaced when the burner (325; FIG. 3) has surpassed its useful life.

The preceding description has been presented only to illustrate and describe the present method and apparatus. It is not intended to be exhaustive or to limit the disclosure to any precise form disclosed. Many modifications and variations are possible in light of the above teaching. It is intended that the scope of the disclosure be defined by the following claims.

What is claimed is:

1. A lamp assembly, comprising:
   a non-metallic reflector having a focal point;
   a datum structure secured to said reflector; and
   a burner assembly having a fireball, said burner assembly being removably coupled to said datum structure such that said fireball is at said focal point when said burner assembly is at an operating temperature;
   wherein said datum structure comprises a plurality of datum surfaces disposed about a perimeter of said datum structure, and wherein said datum structure comprises four protrusions including a first protrusion having a Y-axis alignment surface, a second protrusion having Y-axis alignment and Z-axis alignment surfaces, a third protrusion having a Z-axis alignment surface, and a fourth protrusion having X-axis and Z-axis alignment surfaces.

2. The assembly of claim 1, wherein said burner assembly includes a burner coupled to a header.

3. The assembly of claim 2, wherein said burner is an ultra-high pressure mercury-type burner.

4. The assembly of claim 1, wherein said non-metallic reflector is a glass reflector.

5. A lamp assembly, comprising:
   a non-metallic reflector having a focal point;
   a datum structure secured to said reflector; and
   a burner assembly having a fireball, said burner assembly being removably coupled to said datum structure such that said fireball is at said focal point when said burner assembly is at an operating temperature;
   wherein said datum structure comprises a plurality of alignment surfaces comprising;
   a first alignment surface in a first plane;
   second and third alignment surfaces in a second plane orthogonal to said first plane; and
   fourth, fifth and sixth alignment surfaces in a third plane orthogonal to said first and second planes.

6. A lamp assembly, comprising:
   a non-metallic reflector having a focal point;
   a datum structure secured to said reflector; and
   a burner assembly having a fireball, said burner assembly being removably coupled to said datum structure such that said fireball is at said focal point when said burner assembly is at an operating temperature;
   wherein said burner assembly comprises a burner header and a burner that comprises said fireball, said burner header comprising a plurality of reference surfaces corresponding to alignment surfaces of said datum structure, and wherein said datum structure comprises four protrusions including a first protrusion having a Y-axis alignment surface, a second protrusion having Y-axis alignment and Z-axis alignment surfaces, a third protrusion having a Z-axis alignment surface, and a fourth protrusion having X-axis and Z-axis alignment surfaces.

7. The assembly of claim 6, wherein said reference surfaces comprise orthogonal reference surfaces.

8. A lamp assembly, comprising:
   a non-metallic reflector having a focal point;
   a datum structure secured to said reflector, and
   a burner assembly having a fireball, said burner assembly being removably coupled to said datum structure such that said fireball is at said focal point when said burner assembly is at an operating temperature;
   wherein said datum structure includes:
   first, second, and third surfaces defining a first plane orthogonal to an insertion direction of said burner assembly for limiting travel of said burner assembly in said insertion direction,
   fourth and fifth surfaces for limiting travel of said burner assembly in a first direction orthogonal to said insertion direction; and
   a sixth surface for limiting travel of said burner assembly in a second direction orthogonal to said first direction and said insertion direction.

9. The reflector of claim 8, and wherein said datum structure further includes at least one beveled edge adjacent to at least one of said fourth, fifth, or sixth surfaces to guide said burner assembly to contact with at least one of said fourth, fifth, or sixth surfaces during an insertion operation.

10. method of forming a lamp assembly, comprising:
    removably coupling a burner assembly to a datum structure, said burner assembly including a fireball;
    lighting said burner;
    moving said datum structure and said burner assembly, with said burner lit, to an aligned position relative to a reflector such that said fireball is at a focal point of said reflector; and
    securing said datum structure to said reflector in said aligned position;
    wherein coupling said burner assembly to said datum structure includes placing at least one reference surface on said burner assembly into contact with at least one datum surface on said datum structure, and wherein said datum structure comprises four protrusions including a first protrusion having a Y-axis alignment surface, a second protrusion having Y-axis alignment and Z-axis alignment surfaces, a third protrusion having a Z-axis alignment surface, and a fourth protrusion having X-axis and Z-axis alignment surfaces.

11. The method of claim 10, wherein securing said datum structure to said reflector in said aligned position includes applying an adhesive.

12. The method of claim 10, wherein moving said datum structure and said burner assembly to an aligned position relative to said reflector includes moving said datum structure and said burner assembly to said aligned position relative to a non-metallic reflector.

13. The method of claim 10, further comprising using a light power meter to determine when said fireball is at said focal point.

\* \* \* \* \*

UNITED STATES PATENT AND TRADEMARK OFFICE
CERTIFICATE OF CORRECTION

PATENT NO. : 7,422,346 B2 Page 1 of 1
APPLICATION NO. : 11/192762
DATED : September 9, 2008
INVENTOR(S) : John W. Lee et al.

It is certified that error appears in the above-identified patent and that said Letters Patent is hereby corrected as shown below:

In column 8, line 11, in Claim 8, delete "reflector," and insert -- reflector; --, therefor.

In column 8, line 32, in Claim 10, before "method" insert -- A --.

Signed and Sealed this

Fifth Day of May, 2009

JOHN DOLL
*Acting Director of the United States Patent and Trademark Office*